United States Patent [19]
Horng et al.

[11] Patent Number: 5,663,759
[45] Date of Patent: Sep. 2, 1997

[54] FEATURE PROCESSOR FOR A DIGITAL CAMERA

[75] Inventors: Chun-Hsien Horng, Hsinchu; Pei-Hui Tung, Taoyuan; Chen-Pang Kung, Tainan; Guang-Nan Tzeng, Taichung, all of Taiwan

[73] Assignee: Industrial Technology Research Institute, Hsinchu, Taiwan

[21] Appl. No.: 661,255

[22] Filed: Jun. 10, 1996

[51] Int. Cl.⁶ .................................................. H04N 9/07
[52] U.S. Cl. .......................... 348/222; 348/240; 348/239; 348/231
[58] Field of Search ...................... 348/222, 231, 348/237, 239, 272, 294, 345, 347, 240; H04N 9/07

[56] References Cited

U.S. PATENT DOCUMENTS

| | | | |
|---|---|---|---|
| 4,758,883 | 7/1988 | Kawahara et al. | 348/222 |
| 4,930,014 | 5/1990 | Maeda et al. | 358/209 |
| 5,107,334 | 4/1992 | Matsumoto | 358/180 |
| 5,111,300 | 5/1992 | Nam | 358/209 |
| 5,144,442 | 9/1992 | Ginosar et al. | 348/222 |
| 5,170,249 | 12/1992 | Ohtsuba et al. | 348/222 |
| 5,185,670 | 2/1993 | Lee | 358/227 |
| 5,218,444 | 6/1993 | Mizutani et al. | 358/227 |
| 5,253,046 | 10/1993 | Shiraishi | 348/237 |
| 5,267,044 | 11/1993 | Nozaki et al. | 358/227 |
| 5,325,206 | 6/1994 | Fujita et al. | 348/347 |
| 5,541,651 | 7/1996 | Iura et al. | 348/222 |

*Primary Examiner*—Glenton B. Burgess
*Attorney, Agent, or Firm*—George O. Saile; Larry J. Prescott

[57] ABSTRACT

This invention provides a digital television camera processing system and method for feature processing quantized image signals. A single frame memory is required since the frame memory is located prior to the luminance signal processing circuit and the chroma signal processing circuit. The signal processor provides full screen zoom, partial screen zoom, still picture function, mosaic function, and a combination of these functions. Selection of the function is accomplished with inputs to a memory timing control which controls the output sequencing of the frame memory.

22 Claims, 4 Drawing Sheets

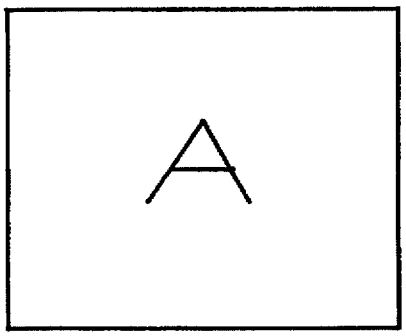
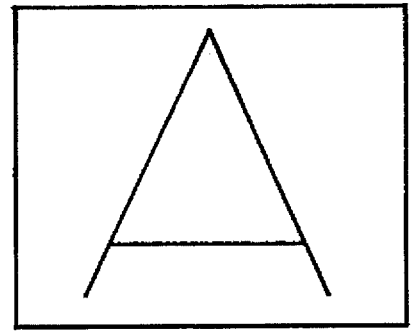
FIG. 2A  FIG. 2B
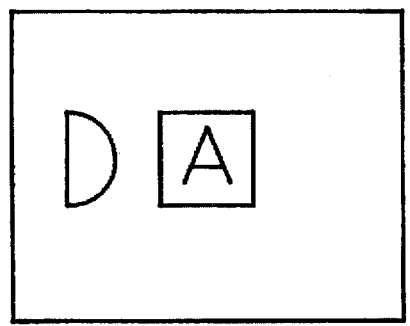
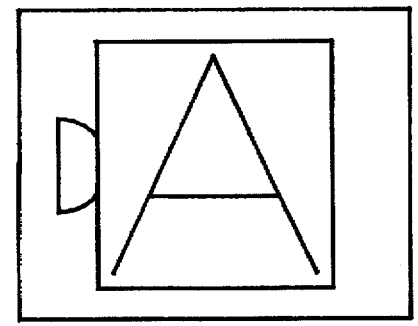
FIG. 3A  FIG. 3B

FEATURE PROCESSOR FOR A DIGITAL CAMERA

BACKGROUND OF THE INVENTION

(1) Field of the Invention

The invention relates to the processing of image signals for a digital mosaic charge coupled device image sensor and more specifically to processing signals for full screen zoom, partial screen zoom, still picture, and mosaic picture functions as well as a combination of these functions.

(2) Description of the Related Art

Processing digital television signals has been studied by a number of workers. U.S. Pat. No. 4,930,014 to Maeda et al. describes a still picture editing function using a first and a second main field memories and an auxiliary field memory. U.S. Pat. No. 5,107,334 to Matsumoto describes a zoom function using a picture image memory. U.S. Pat. No. 5,111,300 to Nam describes reproducing a plurality of image source signals using a number of multi screen memories controlled by a multi screen controller.

U.S. Pat. No. 5,325,206 to Fujita et al. describes a zoom function controlling the magnitude of an image to a fixed size. U.S. Pat. No. 5,267,044 to Nozaki et al. and U.S. Pat. No. 5,218,444 to Mizutani et al. describe an autofocus for a video camera. U.S. Pat. No. 5,185,670 to Lee describes a display on a cathode ray tube screen for displaying a zooming position of the zoom lens in a camcorder.

This invention provides a digital CCD, charge coupled device, image sensor system and method to perform digital image signal processing using a single frame memory which stores quantized image data input from the CCD image sensor system. The invention provides an economical digital CCD image sensor system and method for processing digital image signals to provide a mosaic function, full screen zoom, partial screen zoom, still picture function, and a combination of these functions.

SUMMARY OF THE INVENTION

When editing pictures, such as mosaic, still, or zoom, in a charge coupled device, CCD, image sensor system a frame memory is necessary. In conventional CCD image sensor systems component signals are processed and separated into chroma signals and luminance signals prior to picture editing. This requires at least two frame memories and possibly more which detracts from the economy of the system.

It is a principle object of this invention to provide a feature processor for a digital charge coupled device, CCD, image sensor which can produce full picture zoom, partial picture zoom, still picture, and mosaic functions using only one frame memory.

It is another principle object of this invention to provide a method for processing digital charge coupled device, CCD, image signals to produce full picture zoom, partial picture zoom, still picture, and mosaic functions using only one frame memory.

These objectives are accomplished by using a camera with a charge coupled device, CCD, image sensor. The output of the CCD image sensor is fed to an analog to digital converter to produce quantized image data. The quantized image signals are then sent serially to a frame memory where one frame of the quantized image signals is stored and processed under the control of a memory timing control circuit. The architecture of the improved system makes it possible to process the quantized image signals with a single frame memory which is a considerable cost saving. The desired processing function is selected by inputs to the memory timing control. The processing function can be full picture zoom, partial picture zoom, a still picture function, mosaic function or a combination of these functions.

The output of the frame memory is then sent to a vertical interpolator where the processed digital image signal is adjusted according to the color filter array arrangement. The processed digital image signal is split into a first digital processed signal and a second digital processed signal in the vertical interpolator. The output of the digital processed signals from the frame memory are sent to a luminance signal processing circuit and a first digital to analog converter to form the analog luminance signal of the processed image signal. At the same time the output of the digital processed signals from the vertical interpolator are sent to a color separation circuit, a horizontal interpolator, a chroma signal processing circuit, an encoder and a second digital to analog converter to form the analog chrominance signal of the processed image signal.

The improved system architecture including the frame memory, controlled by the memory timing control circuit, and the vertical interpolator make processing of the image signals possible using only one frame memory. Control of the entire system is provided by a single CCD scanning timing generator so proper timing among the various circuits is maintained.

BRIEF DESCRIPTION OF THE DRAWINGS

FIG. 2A is a representation of the letter A displayed on a television screen without signal processing.

FIG. 2B is a representation of the letter A of FIG. 2A displayed on a television screen with full screen zoom processing.

FIG. 3A is a representation of the letter A and the letter D displayed on a television screen without signal processing.

FIG. 3B is a representation of the letter A and the letter D of FIG. 3A displayed on a television screen with partial screen zoom applied to the letter A.

DESCRIPTION OF THE PREFERRED EMBODIMENTS

Figure 1:
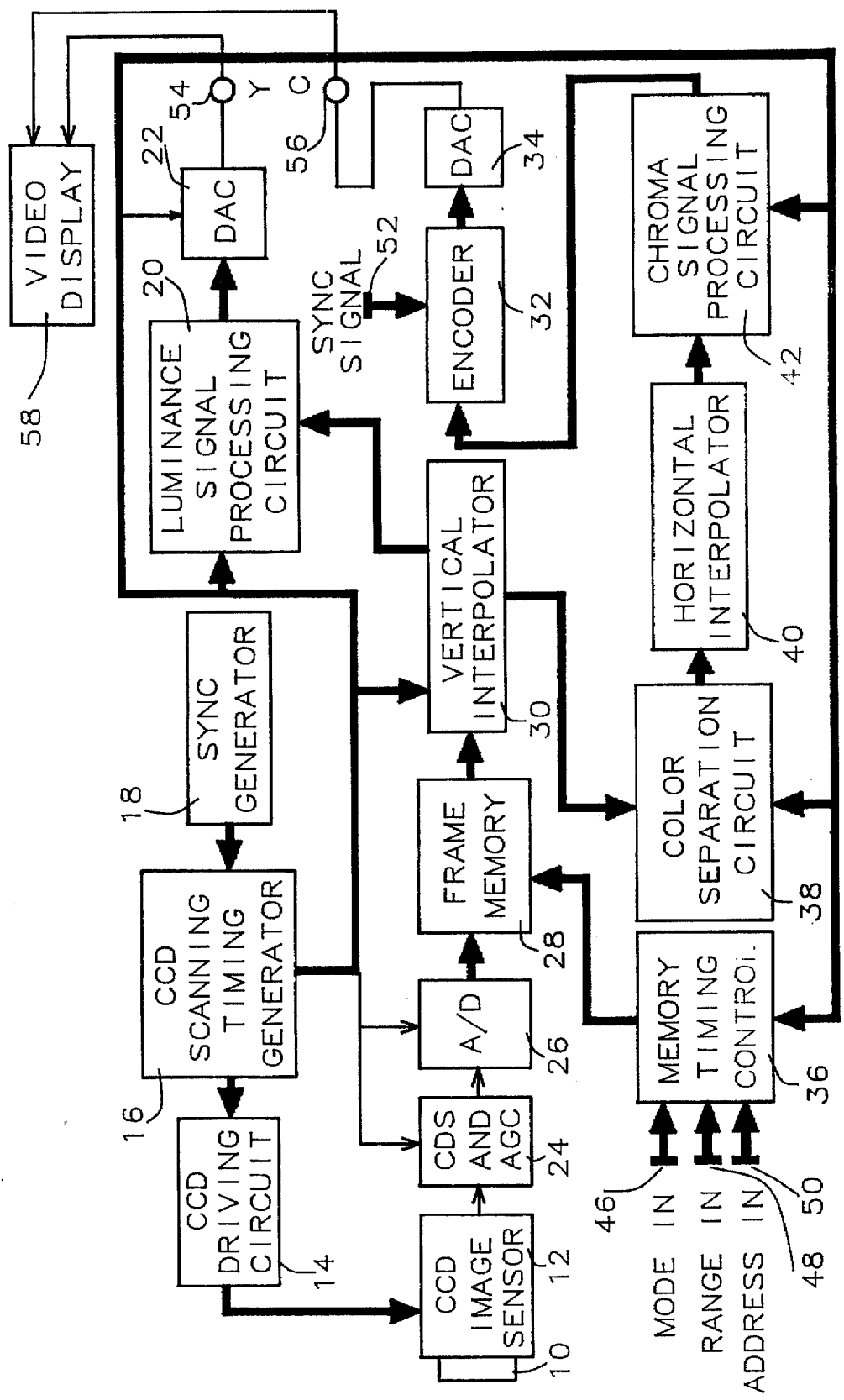
FIG. 1 is a block diagram of the feature processor for a digital camera.

Refer now to FIG. 1 through FIG. 6, there is shown an embodiment of the feature processor for a digital camera. FIG. 1 shows a block diagram of the feature processor for a digital camera or camcorder. The image or picture signals are formed through the color filter array 10 in the charged coupled device, or CCD, image sensor 12, such as a SONY 038™ or the like, as a sequence of frames. The output of the color filter array 10 and CCD image sensor 12, after a low pass filter, is similar to a luminance spectrum. This output can be sent directly through the vertical interpolator 30 to the luminance signal processing circuit 20 without separation of the luminance signal. Each frame is made up of an N row by M column array of pixels. The CCD image sensor is controlled by the CCD driving circuit 14 and the CCD scanning timing generator 16. The CCD scanning timing generator 16, which provides timing for the entire feature processor, is provided with a synchronizing signal from the sync generator 18. The output of the CCD image sensor is sent to correlated double sampling and automatic gain control circuits 24 and then to the analog to digital converter 26 where the signal is quantized. The quantized image signals are then stored in the frame memory 28 under the control of the memory timing control 36.

The memory timing control 36 is synchronized with the CCD scanning timing generator 16 and controlled by the Mode In 46, Range In 48, and Address In 50 inputs to the memory timing control 36. In this portion of the block diagram the signals are digital signals as indicated by the heavier flow lines in the block diagram. The Mode In 46, Range In 48, and Address In 50 inputs to the memory timing control 36 are used to control the feature processing provided to the digital image frame stored in the frame memory 28. The feature processing can provide a full screen zoom function as shown in FIG. 2A and FIG. 2B, a partial screen zoom function as shown in FIG. 3A and FIG. 3B, a still picture function, a mosaic function, or a combination of these functions.

Figure 4:
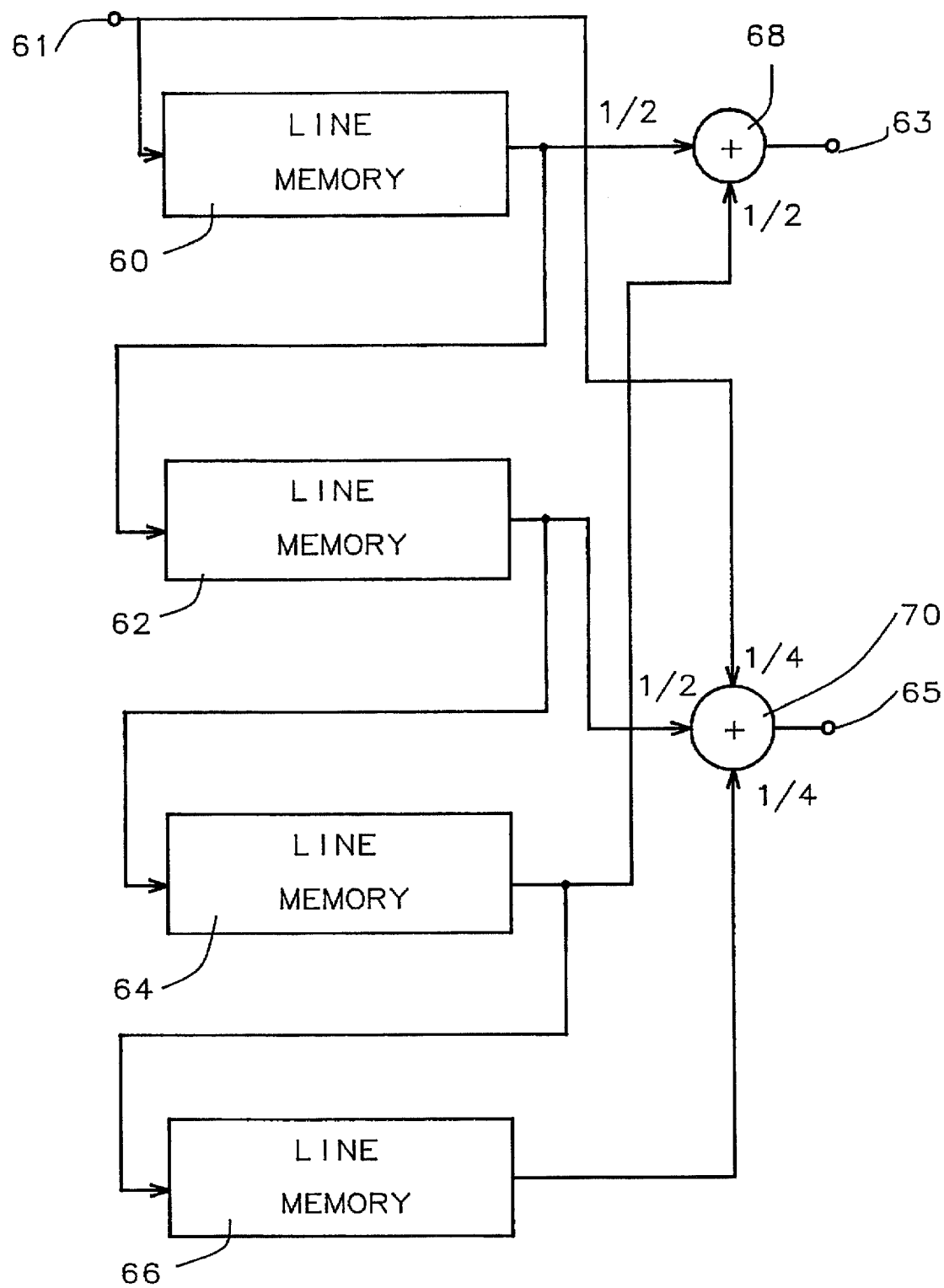
FIG. 4 is a block diagram of the front end of the vertical interpolator.
Figure 5:
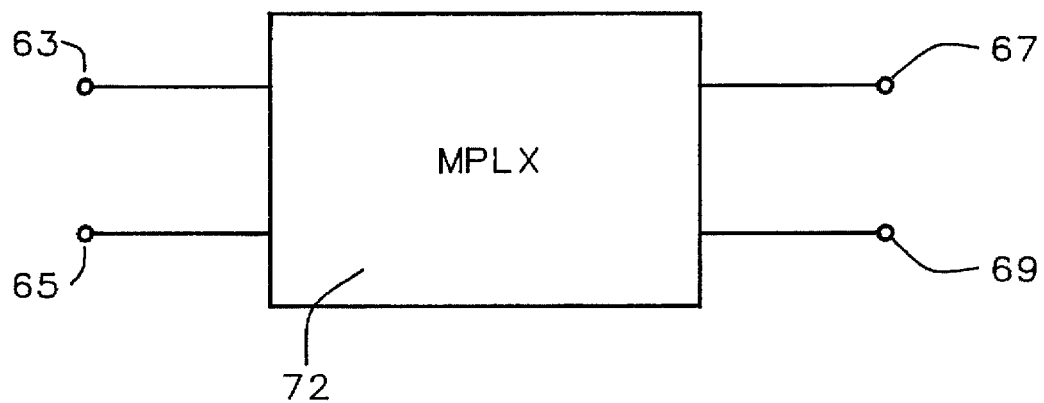
FIG. 5 is a block diagram of the back end of the vertical interpolator.

The processed digital image signals are then sent to the vertical interpolator 30. The vertical interpolator 30 is shown in FIGS. 4 and 5. As shown in FIG. 4 the vertical interpolator has four line memories in series, a first line memory 60, a second line memory 62, a third line memory 64, and a fourth line memory 66. Each line memory stores a row of pixels for one line period delayed by one line period relative to the previous line memory. The line period is the time required to produce a row of pixels in the camera or display a row of pixels in a video display and is equal to the inverse of the line frequency. Each line memory has the effect of delaying a row of pixels by one line period. The interim first digital processed signal 63 is the output of the first adder 68 and is equal to the sum of one half of a pixel element in one row of pixels delayed by one line period, stored in the first line memory 62, added to one half of each element in one row of pixels delayed by three line periods, stored in the third line memory 64. The interim second digital processed signal 65 is the output of the second adder 70 and is equal to the sum of one fourth of a pixel element in one row of pixels having no delay added to one half of each element in one row of pixels delayed by two line periods stored in the second line memory 62 added to one fourth of each element in one row of pixels delayed by four line periods stored in the fourth line memory 66. As shown in FIG. 5, a multiplexer 72 then alternately selects the interim first digital processed signal 63 and interim second digital processed signal 65 as desired to derive the first digital processed signal 67 and the second digital processed signal 69 during alternate line periods. The vertical interpolator is necessary to adjust for the color filter used in forming the original image signal.

Refer again to FIG. 1. This invention is utilized in a mosaic CCD image sensor system. The mosaic CCD image sensor system 12 has four component colors and after passing the image signal through the correlated double sampling and automatic gain control circuits 24 and analog to digital converter 26 there are four color component signals which are fed to the frame memory 28. In signal processing four component signals must be processed as a unit. In the vertical direction signal processing in the vertical interpolator 30 a line memory is necessary to delay a row of signals so that the signals of two lines can be processed in pairs. In the horizontal direction signal processing in the horizontal interpolator 40 a delay element 84, see FIG. 6, such as a register is necessary so the signals of the pixels of a line can be processed in pairs.

This embodiment requires only a single frame memory 28 since the frame memory 28 as well as a vertical interpolator 30 are connected to be placed before signal separation in the luminance signal processing circuit 20 and the chroma signal processing circuit 42. The signals from the frame memory 28 are controlled by the memory timing control circuit 36 to read out signals in pairs both in the vertical and horizontal directions according to different operational modes such as mosaic function, still function, and zoom function, etc. selected by the mode in 46, range in 48, and address in 50 inputs.

The vertical interpolator 30 of this invention uses 2, 4, or 6 line memories. In this embodiment 4 line memories are used, see FIG. 4. When 4 line memories are used the interpolator functions as a comb filter with a characteristic function $1+Z^{-2}$. The comb filter effect can increase the signal to noise ratio by about 6 dB.

Returning now to FIG. 1 the first digital processed signal is sent to the luminance signal processing circuit 20. The output of the luminance signal processing unit is sent to the first digital to analog converter 22. The analog output 54 of the first digital to analog converter 22 is the luminance signal of the processed image signal. Both the luminance signal processing circuit 20 and the first digital to analog converter are controlled by the CCD scanning timing generator 16.

Figure 6:
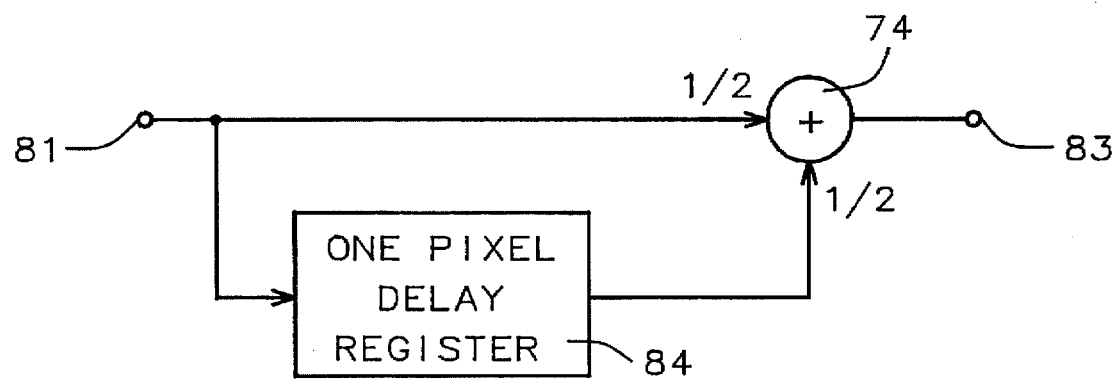
FIG. 6 is a block diagram of the horizontal interpolator.

The first and second digital processed signals, 67 and 69, are sent to the color separation circuit 38 and then to the horizontal interpolator 40. The horizontal interpolator is shown in FIG. 6 and comprises a 1 pixel delay register 84 and an adder 74. The output of the horizontal interpolator is a pixel where one half of each element of one row of pixels with no delay is added to one half of each element of one row of pixels delayed by two line periods.

Returning again to FIG. 1 the output of the horizontal interpolator 40 is sent to the chroma signal processing circuit 42 then to the encoder 32 and to the second digital to analog converter 32. The color separation circuit 38 the chroma signal processing circuit 42 and the second digital to analog converter 34 are controlled by the CCD scanning timing generator 16. The encoder 32 is controlled by a synchronizing signal 52 which is sent by the sync generator 18. The analog output 56 of the second digital to analog converter 34 is the chrominance signal of the processed image signal. The luminance signal of the processed image signal, the analog output 54 of the first digital to analog converter 22, and the crominance signal of the processed image signal, the analog output 56 of the second digital to analog converter 34, are sent to a video display 58.

While the invention has been particularly shown and described with reference to the preferred embodiments thereof, it will be understood by those skilled in the art that various changes in form and details may be made without departing from the spirit and scope of the invention.

What is claimed is:

1. A feature processor, comprising:

a line frequency;

a line period wherein said line period is the inverse of said line frequency;

a charge coupled device image sensor having an input and an image signal output;

a charge coupled device driving circuit having an input and an output wherein said output of said charge coupled device driving circuit is connected to said input of said charge coupled device image sensor;

a charge coupled device scanning timing generator having an input a first output and a second output wherein said second output of said charge coupled device scanning timing generator is connected to said input of said charge coupled device driving circuit;

a correlated double sampling and automatic gain control circuit having a control input, a signal input, and an output wherein said signal input of said correlated double sampling and automatic gain control circuit is connected to said image signal output of said charge coupled device image sensor and said control input of said correlated double sampling and automatic gain control circuit is connected to said first output of said charge coupled device scanning timing generator;

a first analog to digital converter having a signal input, a control input, and an output wherein said signal input of said analog to digital converter is connected to said output of said correlated double sampling and automatic gain control circuit, said control input of said first analog to digital converter is connected to said first output of said charge coupled device scanning timing generator, and said output of said first analog to digital converter comprises a row of pixels during said each said line period;

a memory timing control having a number of function inputs, a control input, and an output wherein said control input is connected to said first output of said charge coupled device scanning timing generator;

a frame memory having a signal input, a control input and an output wherein said signal input of said frame memory is connected to said output of said first analog to digital converter and said control input of said frame memory is connected to said output of said memory timing control;

a vertical interpolator having a signal input, a control input, a first output, and a second output wherein said signal input of said vertical interpolator is connected to said output of said frame memory and said control input of said vertical interpolator is connected to said first output of said charge coupled device scanning timing generator;

a luminance signal processing circuit having a signal input, a control input, and an output wherein said signal input of said luminance signal processing circuit is connected to said first output of said vertical interpolator and said control input of said luminance signal processing circuit is connected to said first output of said charge coupled device scanning timing generator;

a color separation circuit having a signal input, a control input, and an output wherein said signal input of said color separation circuit is connected to said second output of said vertical interpolator and said control input of said color separation circuit is connected to said first output of said charge coupled device scanning timing generator;

a horizontal interpolator having an input and an output wherein said input of said horizontal interpolator is connected to said output of said color separation circuit;

a chroma signal processing circuit having a signal input, a control input, and an output wherein said signal input of said chroma signal processing circuit is connected to said output of said horizontal interpolator and said control input of said chroma signal processing circuit is connected to said first output of said charge coupled device scanning timing generator;

an encoder circuit having a signal input, a control input, and an output wherein said signal input of said encoder circuit is connected to said output of said chroma signal processing circuit and said control input of said encoder circuit receives a synchronizing signal;

a first digital to analog converter having a signal input, a control input, and an output wherein said signal input of said first digital to analog converter is connected to said output of said luminance signal processing circuit and said control input of said first digital to analog converter is connected to said first output of said charge coupled device scanning timing generator;

a second digital to analog converter having a signal input, a control input, and an output wherein said signal input of said second digital to analog converter is connected to said output of said encoder circuit and said control input of said second digital to analog converter is connected to said first output of said charge coupled device scanning timing generator; and a video display having a first signal input and a second signal input wherein said first signal input of said video display is said output of said first digital to analog converter and said second signal input of said video display is said output of said second digital to analog converter.

2. The feature processor of claim 1 wherein said charge coupled device image sensor further comprises a color filter array.

3. The feature processor of claim 1 wherein said vertical interpolator comprises a number of line memories wherein each said line memory stores a row of pixels for one line period.

4. The feature processor of claim 3 wherein said number of line memories is four line memories.

5. The feature processor of claim 3 wherein said number of line memories is two line memories.

6. The feature processor of claim 3 wherein said number of line memories is six line memories.

7. The feature processor of claim 1 wherein only one said frame memory is used.

8. The feature processor of claim 1 wherein said horizontal interpolator comprises a one pixel delay register.

9. The feature processor of claim 1 wherein said function inputs of said memory timing control provide a still picture function.

10. The feature processor of claim 1 wherein said function inputs of said memory timing control provide a full screen zoom function.

11. The feature processor of claim 1 wherein said function inputs of said memory timing control provide a partial screen zoom function.

12. A method for processing a digital television signal, comprising the steps of:

providing a line frequency;

providing a line period wherein said line period is the inverse of said line frequency;

providing a synchronizing signal;

providing a charge coupled device image sensor wherein an image signal is produced;

providing a charge coupled device scanning timing generator;

providing a correlated double sampling and automatic gain control circuit;

providing a first analog to digital converter;

providing a memory timing control having function inputs wherein said memory timing control operates under the control of said charge coupled device scanning timing generator;

providing a frame memory;

providing a vertical interpolator;

providing a luminance signal processing circuit;

providing a color separation circuit;

providing a horizontal interpolator;

providing a chroma signal processing circuit;

providing an encoder circuit;

providing a first digital to analog converter;

providing a second digital to analog converter;

providing a video display;

forming a quantized image signal from said image signal using said correlated double sampling and automatic gain control circuit and said first analog to digital converter;

storing said quantized image signal to said frame memory under the control of said memory timing control;

sending a part or all of the contents of said frame memory to said vertical interpolator under the control of said memory timing control and said charge coupled device scanning timing generator thereby forming a vertical interpolator signal;

sending said vertical interpolator signal to said luminance signal processing circuit under the control of said charge coupled device scanning timing generator thereby producing a luminance signal;

sending said vertical interpolator signal to said color separation circuit under the control of said charge coupled device scanning timing generator thereby producing a color separation signal;

sending said color signal through said horizontal interpolator to said chroma signal processing circuit under the control of said charge coupled device scanning timing generator thereby producing a chroma signal;

sending said luminance signal through said first digital to analog converter to said video display under the control of said charge coupled device scanning timing generator; and sending said chroma signal through said encoder and said second digital to analog converter to said video display under the control of said charge coupled device scanning timing generator and said synchronizing signal.

13. The method of claim 12 wherein said charge coupled device image sensor further comprises a color filter array.

14. The method of claim 12 wherein said vertical interpolator comprises a number of line memories wherein each said line memory stores a row of pixels for one line period.

15. The method of claim 14 wherein said number of line memories is four line memories.

16. The method of claim 14 wherein said number of line memories is two line memories.

17. The method of claim 14 wherein said number of line memories is six line memories.

18. The method of claim 12 wherein only one said frame memory is used.

19. The method of claim 12 wherein said horizontal interpolator comprises a one pixel delay register.

20. The method of claim 12 wherein said function inputs of said memory timing control provide a still picture function.

21. The method of claim 12 wherein said function inputs of said memory timing control provide a full screen zoom function.

22. The method of claim 12 wherein said function inputs of said memory timing control provide a partial screen zoom function.

* * * * *